United States Patent
Seshadri et al.

(10) Patent No.: US 11,023,707 B2
(45) Date of Patent: Jun. 1, 2021

(54) SYSTEM AND METHOD FOR SELECTING A PART OF A VIDEO IMAGE FOR A FACE DETECTION OPERATION

(71) Applicant: Avigilon Corporation, Vancouver (CA)

(72) Inventors: Keshav Thirumalai Seshadri, Medford, MA (US); Peter L. Venetianer, McLean, VA (US)

(73) Assignee: AVIGILON CORPORATION, Vancouver (CA)

(*) Notice: Subject to any disclaimer, the term of this patent is extended or adjusted under 35 U.S.C. 154(b) by 111 days.

(21) Appl. No.: 16/172,517

(22) Filed: Oct. 26, 2018

(65) Prior Publication Data
US 2019/0130165 A1   May 2, 2019

Related U.S. Application Data

(60) Provisional application No. 62/578,276, filed on Oct. 27, 2017.

(51) Int. Cl.
*G06K 9/00* (2006.01)
*G06K 9/62* (2006.01)
(Continued)

(52) U.S. Cl.
CPC ..... *G06K 9/00228* (2013.01); *G06K 9/00288* (2013.01); *G06K 9/00771* (2013.01); *G06K 9/6271* (2013.01); *G06T 11/60* (2013.01); *G06K 9/4628* (2013.01); *G06T 2210/12* (2013.01); *G06T 2210/22* (2013.01)

(58) Field of Classification Search
CPC ........... G06K 9/00228; G06K 9/00288; G06K 9/6271; G06K 9/00771; G06K 9/4628; G06T 11/60; G06T 2210/22; G06T 2210/12
See application file for complete search history.

(56) References Cited

U.S. PATENT DOCUMENTS

| 7,627,171 B2 | 12/2009 | Hampshire, II et al. |
| 8,224,029 B2 | 7/2012 | Saptharishi et al. |

(Continued)

FOREIGN PATENT DOCUMENTS

WO    20170091426    6/2017

OTHER PUBLICATIONS

Hong, D. et al., "A Method of Gesture Segmentation Based on Skin Color and Background Difference Method," Proceedings of the 2nd International Conference on Computer Science and Electronics Engineering (ICCSEE), 2013.

(Continued)

*Primary Examiner* — Syed Haider
(74) *Attorney, Agent, or Firm* — Perry + Currier, Inc.

(57) ABSTRACT

A cropped bounding box selection operation is performed on a video captured by a video capture and playback system, to select one or more cropped bounding boxes from the video for processing by a face detection operation. The cropped bounding box selection operation identifies objects from the video images and assigns a ranking to each identified object based on certain priority criteria; one or more cropped bounding boxes corresponding to the objects with the highest ranking(s) are then processed by the face detection operation to detect a face in each object.

21 Claims, 8 Drawing Sheets

(51) Int. Cl.
*G06T 11/60* (2006.01)
*G06K 9/46* (2006.01)

(56) References Cited

U.S. PATENT DOCUMENTS

| | | | | |
|---|---|---|---|---|
| 8,934,709 | B2 | 1/2015 | Saptharishi et al. | |
| 2011/0128362 | A1* | 6/2011 | Shi | G06K 9/00255 348/77 |
| 2013/0243268 | A1* | 9/2013 | Bedros | G06K 9/036 382/118 |
| 2015/0103178 | A1* | 4/2015 | Itoh | G06K 9/00771 348/159 |
| 2019/0065895 | A1* | 2/2019 | Wang | G06K 9/00771 |

OTHER PUBLICATIONS

Mahmoodi, M.R., et al., "A Comprehensive Survey on Human Skin Detection," International Journal of Image, Graphics and Signal Processing (IJIGSP), vol. 8, No. 5, May 2016, pp. 1-35.

Shehadeh, H., et al., "Human Face Detection Using Skin Color Information," 2010 IEEE International Conference on Electro/Information Technology, May 20-22, 2010, Normal, Illinois, USA.

Chandrappa, D.N., et al., "Face Detection in Color Images Using Skin Color Model Algorithm Based on Skin Color Information," 2011 3rd International Conference on Electronics Computer Technology, Apr. 8-10, 2011, Kanyakumari, India.

Thakur, S., et al., "Face Detection Using Skin Tone Segmentation," 2011 World Congress on Information and Communication Technologies, Dec. 11-14, 2011, Mumbai, India.

Rosebrock, A. "Skin Detection: A Step-by-Step Example using Python and OpenCV," https://www.pyimagesearch.com/2014/08/18/skin-detection-step-step-example-using-python-opencv/, Aug. 18, 2014.

Liu, R., et al., "Image Partial Blur Detection and Classification," 2008 IEEE Conference on Computer Vision and Pattern Recognition, Jun. 23-28, 2008, Anchorage, Alaska, USA.

Fronthaler, H., et al., "Automatic Image Quality Assessment with Application in Biometrics," 2006 Conference on Computer Vision and Pattern Recognition Workshop (CVPRW'06), New York City, New York, Jun. 17-22, 2006, pp. 30-35.

Li, H., et al., "Automatic No-Reference Image Quality Assessment," Springerplus Jul. 16, 2016, 5(1) 1097.

Rosebrock, A., "Blur Detection with OpenCV," https://www.pyimagesearch.com/2015/09/07/blur-detection-with-opencv/, Sep. 7, 2015.

Pertuz, S., et al., "Analysis of Focus Measure Operators for Shape-From-Focus," 2013 Pattern Recognition, May 2013, vol. 46:5, p. 1415-1432.

Pech-Pacheco, J.L., et al., "Diatom Autofocusing in Brightfield Microscopy: a Comparative Study," Proceedings 15th International Conference on Pattern Recognition, ICPR-2000, Sep. 3-7, 2000, Barcelona, Spain, available at <https://ieeexplore.ieee.org/document/903548>.

International Search Report for International Application No. PCT/CA2018/051363, dated Feb. 4, 2019.

* cited by examiner

SYSTEM AND METHOD FOR SELECTING A PART OF A VIDEO IMAGE FOR A FACE DETECTION OPERATION

RELATED APPLICATIONS

This application claims the benefit of U.S. provisional patent application No. 62/578,276, filed on Oct. 27, 2017, which is hereby incorporated by reference in its entirety.

FIELD

The present subject-matter relates to video surveillance, and more particularly to selecting a part of a video image for a face detection operation.

BACKGROUND

Automated security and surveillance systems typically employ video cameras or other image capturing devices or sensors to collect image data such as video. In the simplest systems, images represented by the image data are displayed for contemporaneous screening by security personnel and/or recorded for later review after a security breach. In those systems, the task of detecting and classifying visual objects of interest is performed by a human observer. A significant advance occurs when the system itself is able to perform object detection and classification, either partly or completely.

In a typical surveillance system, for example, one may be interested in the system detecting a human that moves through the environment. In particular, a user may be interested in the system detecting a human face for identification purposes, as it can be very time consuming for security personnel to manually review video footage to identify a person of interest. Computer-implemented face detection of humans in the images represented by the image data captured by the cameras can significantly facilitate the task of reviewing relevant video segments by the security personnel.

However, computer-implemented analysis of video to detect and recognize faces require substantial computing resources. Running a face detection operation on an entire frame of each video image can be computationally expensive, especially when identification is desired on a real time basis. It would therefore be desirable to provide a method for detecting at least one face of a person in a video with a reduced computational overhead.

SUMMARY

The embodiments described herein provide in one aspect a method for selecting an object for a face detection operation, comprising: receiving a video frame of a scene captured by a video capture device; identifying an object in the video frame and producing a cropped bounding box (which may also interchangeably be referred to as a "chip" throughout this document) comprising a portion of the video frame bounding the identified object and metadata representing one or more characteristics of the identified object; assigning a ranking to the object, wherein the ranking is based on the one or more characteristics being associated with a higher or lower priority for detecting a human face in the cropped bounding box; and selecting the cropped bounding box for the face detection operation when the assigned ranking meets a selected threshold.

The one or more characteristics can include a trajectory, and a trajectory moving away from the video capture device can be associated with a lower priority. The method can further comprise identifying a potential occlusion in the video, in which case a trajectory moving towards the potential occlusion is associated with a higher priority.

The one or more characteristics can additionally or alternatively include a human classification, and a human classification having a confidence value exceeding a selected threshold can be associated with a higher priority.

The one or more characteristics can additionally or alternatively include a color, and a color corresponding to a human skin tone can be associated with a higher priority.

The one or more characteristics can additionally or alternatively include pixel location and color, and a selected percentage of pixels having colors corresponding to a human skin tone can be associated with a higher priority.

The one or more characteristics can additionally or alternatively include pixel sharpness or contrast, and pixels of the cropped bounding box meeting a selected sharpness or contrast threshold can be associated with a higher priority.

The one or more characteristics can additionally or alternatively be a previously detected face, and an object having a previously detected face detected after a selected time period can be associated with a higher priority.

The one or more characteristics can additionally or alternatively include a quality of a previously detected face, and an object having a previously detected face with a quality below a selected threshold can be associated with a higher priority.

The one or more characteristics can additionally or alternatively include a location, and a location with a number of previous face detections exceeding a selected threshold can be associated with a higher priority.

According to another aspect, there is provided a non-transitory computer readable medium having recorded thereon program code executable by a processor to perform a method comprising: receiving a video frame of a scene captured by a video capture device; identifying an object in the video frame and producing a cropped bounding box comprising a portion of the video frame bounding the identified object and metadata representing one or more characteristics of the identified object; assigning a ranking to the object, wherein the ranking is based on associating the one or more characteristics with a higher or lower priority for detecting a human face in the cropped bounding box; and selecting the cropped bounding box for a face detection operation when the assigned ranking meets a selected threshold.

According to yet another aspect, there is provided a system for selecting an object for a face detection operation, comprising: a video capture device configured to capture a video of a scene; and a video analytics module communicative with the video capture device to receive the video. The video analytics module comprises a processor and a memory having stored thereon program code executable by the processor to: identify an object in a video frame and produce a cropped bounding box comprising a portion of the video frame bounding the identified object and metadata representing one or more characteristics of the identified object; assign a ranking to the object, wherein the ranking is based on the one or more characteristics being associated with a higher or lower priority for detecting a human face in the cropped bounding box; and select the cropped bounding box for the face detection operation when the assigned ranking meets a selected threshold.

According to some example embodiments the above systems may be implemented in instructions that are stored on a non-transitory computer-readable storage medium, which cause the processor to perform a method for appearance searching.

BRIEF DESCRIPTION OF THE DRAWINGS

The detailed description refers to the following figures, in which.

Figure 1:
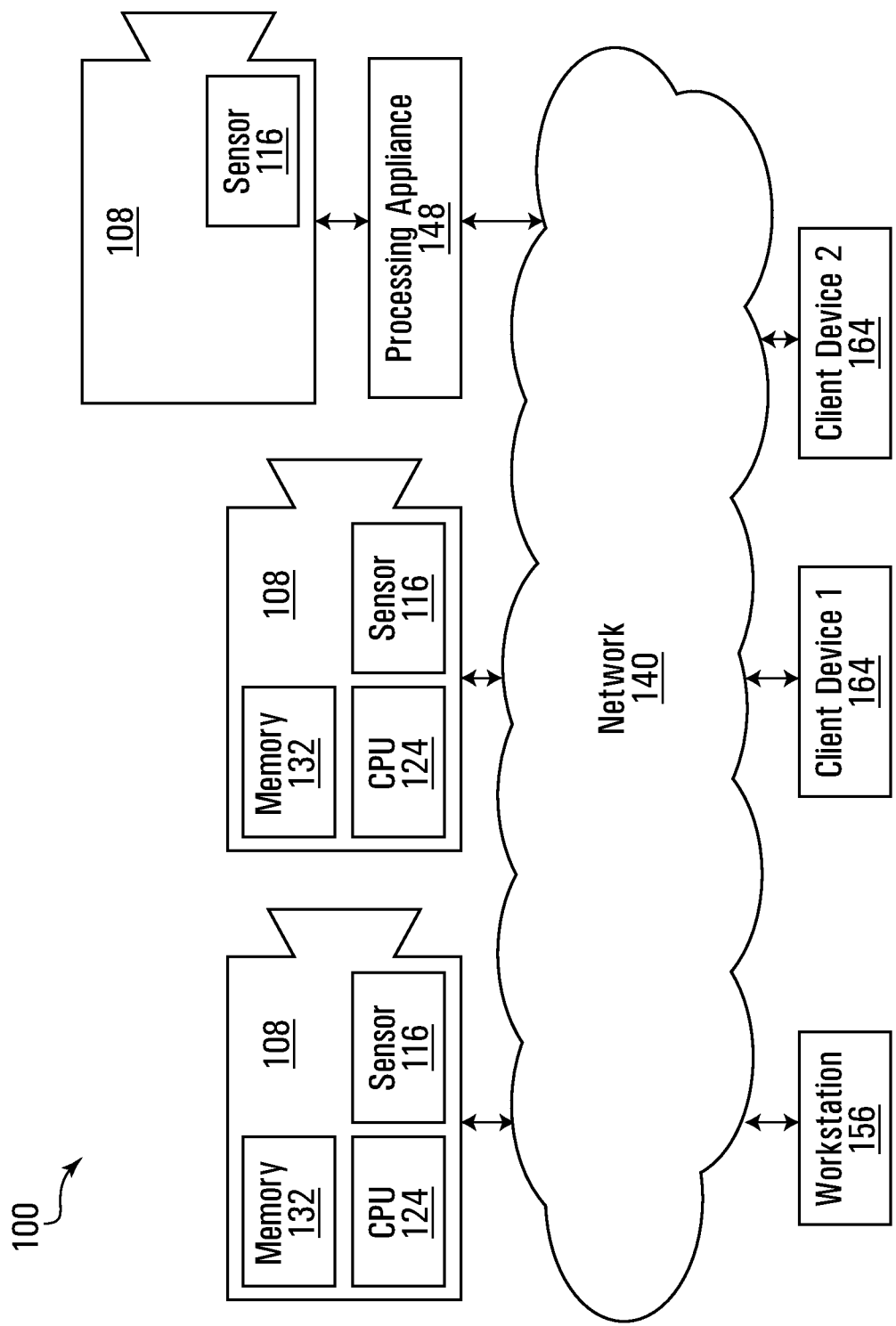
FIG. 1 illustrates a block diagram of connected devices of a video capture and playback system according to an example embodiment.

It will be appreciated that for simplicity and clarity of illustrates, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION OF VARIOUS EMBODIMENTS

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

"Video" herein refers to data produced by a video capture device and that represents images captured by the video capture device. The image may include a plurality of sequential image frames, which together form a video captured by the video capture device. Each image frame may be represented by a matrix of pixels, each pixel having a pixel image value. For example, the pixel image value may be a numerical value on grayscale (ex; 0 to 255) or a plurality of numerical values for colored images. Examples of color spaces used to represent pixel image values in image data include RGB, YUV, CYKM, YCBCR 4:2:2, YCBCR 4:2:0 images.

"Metadata" or variants thereof herein refers to information obtained by computer-implemented analysis of images including images in video. For example, processing video may include, but is not limited to, image processing operations, analyzing, managing, compressing, encoding, storing, transmitting and/or playing back the video data. Analyzing the video may include segmenting areas of image frames and detecting visual objects, tracking and/or classifying visual objects located within the captured scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the invention described herein include a cropped bounding box selection operation performed on video images captured by a video capture and playback system, to select one or more parts of the video image for processing by a face detection operation. The cropped bounding box selection operation identifies one or more objects in the video images and assigns a ranking to each identified object based on certain priority criteria; one or more cropped bounding boxes associated with the object with the highest ranking(s) are then processed by the face detection operation to detect a face in each processed cropped bounding box.

Referring now to FIG. 1, therein illustrated is a block diagram of connected devices of a video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device 108 being operable to capture a plurality of images and produce image data representing the plurality of captured images. The video capture device 108 (also referred to as camera 108) is an image capturing device and includes security video cameras.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultra-violet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal feature is to capture images or video. In some example embodiments, the dedicated camera may perform functions associated to the captured images or video, such as but not limited to processing the image data produced by it or by another video capture device 108. For example, the dedicated camera may be a surveillance camera, such as any one of a pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors and one or more network interfaces. The memory device can include a local memory (e.g. a random access memory and a cache memory) employed during execution of program instructions. The processor executes computer program instructions (e.g., an operating system and/or application programs), which can be stored in the memory device.

In various embodiments the processor 124 may be implemented by any processing circuit having one or more circuit units, including a digital signal processor (DSP), graphics processing unit (GPU), video processing unit, or vision processing unit (VPU), embedded processor, etc., and any combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 116 and the network interface may be implemented within a SOC. Furthermore, when implemented in this way, a general purpose processor and one or more of a GPU and a DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any communications network that provides reception and transmission of data. For example, the network 140 may be a local area network, external network (e.g. WAN, Internet) or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processor and one or more memory devices coupled to a processor (CPU). The processing appliance 148 may also include one or more network interfaces.

For example, and as illustrated, the processing appliance 148 is connected to a video capture device 108 which may not have memory 132 or CPU 124 to process image data. The processing appliance 148 may be further connected to the network 140.

According to one exemplary embodiment, and as illustrated in FIG. 1, the video capture and playback system 100 includes at least one workstation 156 (e.g. server), each having one or more processors which may include graphics processing units (GPUs). The at least one workstation 156 may also include storage memory. The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (e.g.: mouse, keyboard, touchscreen). The client device 164 is operable to display on its display device a user interface for displaying information, receiving user input, and playing back video. For example, the client device may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
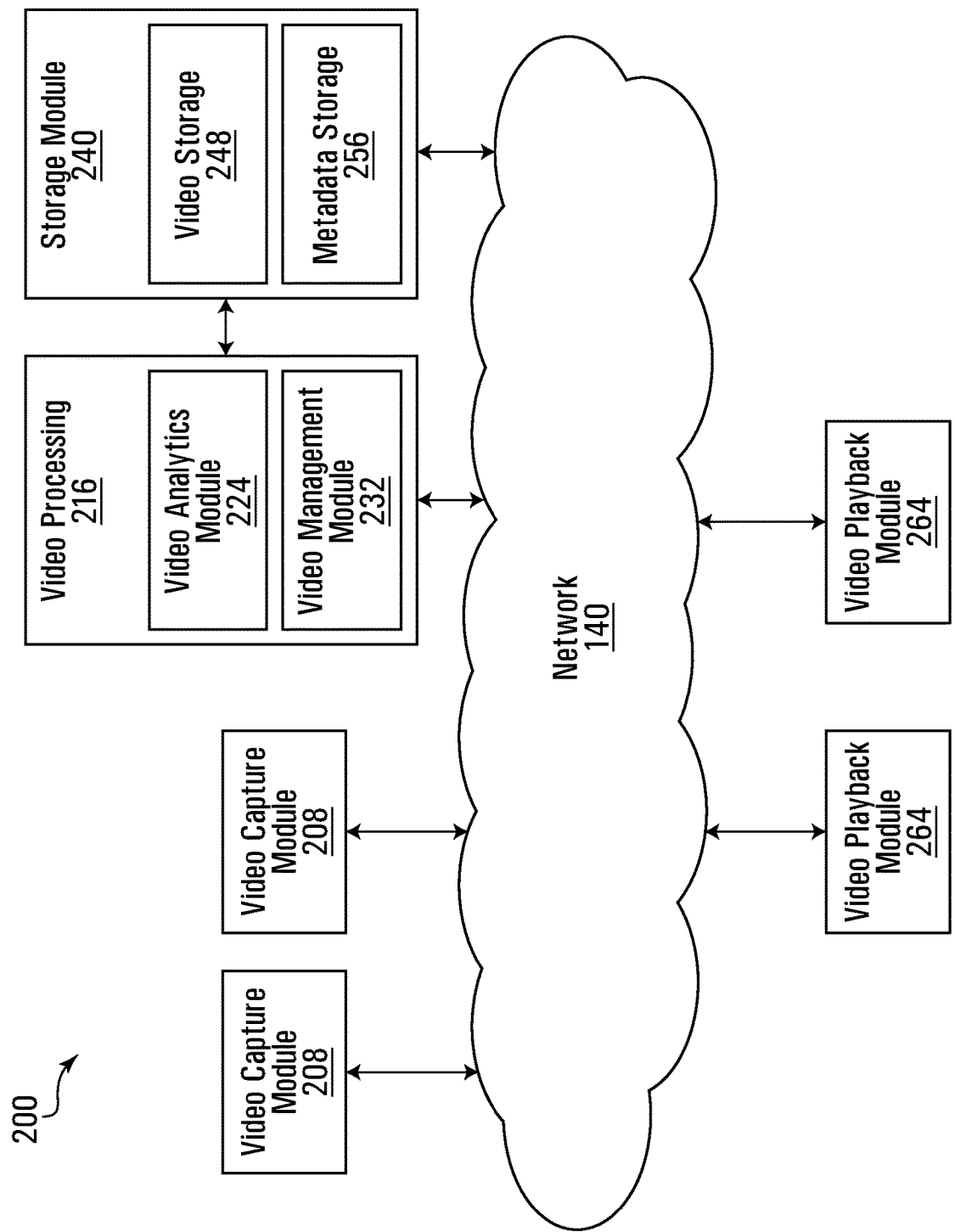
FIG. 2A illustrates a block diagram of a set of operational modules of the video capture and playback system according to one example embodiment.

Referring now to FIG. 2A, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1.

The set 200 of operational modules include at least one video capture module 208. For example, each video capture device 108 may implement a video capture module 208. The video capture module 208 is operable to control one or more components (e.g. sensor 116, etc.) of a video capture device 108 to capture images.

The set 200 of operational modules includes a subset 216 of image data processing modules. For example, and as illustrated, the subset 216 of image data processing modules may include a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. In the embodiments described herein, the determinations include selecting one or more cropped bounding boxes for processing in a face detection operation, and the output metadata includes characteristics of the objects that are relevant to determining which cropped bounding boxes to select for the face detection operation. Other examples of determinations made by the video analytics module 224 may include one or more of foreground/background segmentation, object detection, object tracking, object classification, virtual tripwire, anomaly detection, face detection, license plate recognition, identifying objects "left behind", monitoring objects (e.g. to protect from stealing), unusual motion, and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 may receive input from the video analytics module 224 and adjust compression/storage/transmission based on the content of the video, and can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224.

It will be understood that while video storage module 248 and metadata storage module 256 are illustrated as separate modules, they may be implemented within a same hardware storage device whereby logical rules are implemented to separate stored video from stored metadata. In other example embodiments, the video storage module 248 and/or the metadata storage module 256 may be implemented within a plurality of hardware storage devices in which a distributed storage scheme may be implemented.

The set of operational modules further includes at least one video playback module 264, which is operable to receive image data and playback the image data as a video. For example, the video playback module 264 may be implemented on a client device 164.

The operational modules of the set 200 may be implemented on one or more of the image capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other embodiments, some functionalities of an operational module of the set 200 may be partly implemented on a first device while other functionalities of an operational module may be implemented on a second device. For example, video analytics functionalities may be split between one or more of an image capture device 108, processing appliance 148 and workstation 156. Similarly, video management functionalities may be split between one or more of an image capture device 108, processing appliance 148 and workstation 156.

Figure 2B:
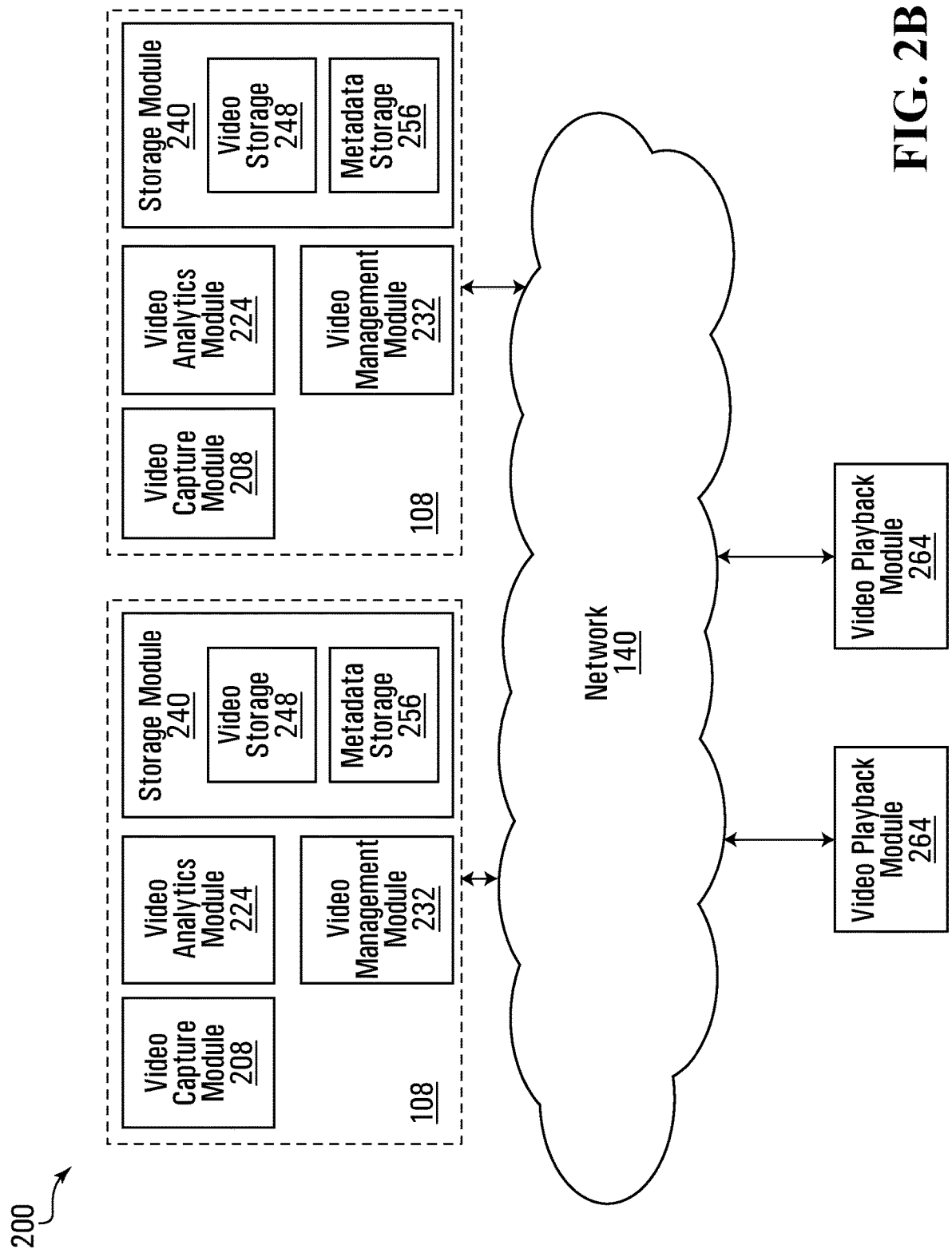
FIG. 2B illustrates a block diagram of a set of operational modules of the video capture and playback system according to one particular example embodiment wherein a video analytics module, a video management module and a storage device are implemented on the one or more image capture devices.

Referring now to FIG. 2B, therein illustrated is a block diagram of a set 200 of operational modules of the video capture and playback system 100 according to one particular example embodiment wherein the video analytics module 224, the video management module 232 and the storage module 240 is wholly implemented on the one or more image capture devices 108. Alternatively, the video analytics module 224, the video management module 232 and the storage module 240 is wholly implemented on the processing appliance 148.

It will be appreciated that allowing the subset 216 of image data (video) processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (e.g. manufacturers) or retrofitting an existing video capture and playback system.

Figure 3:
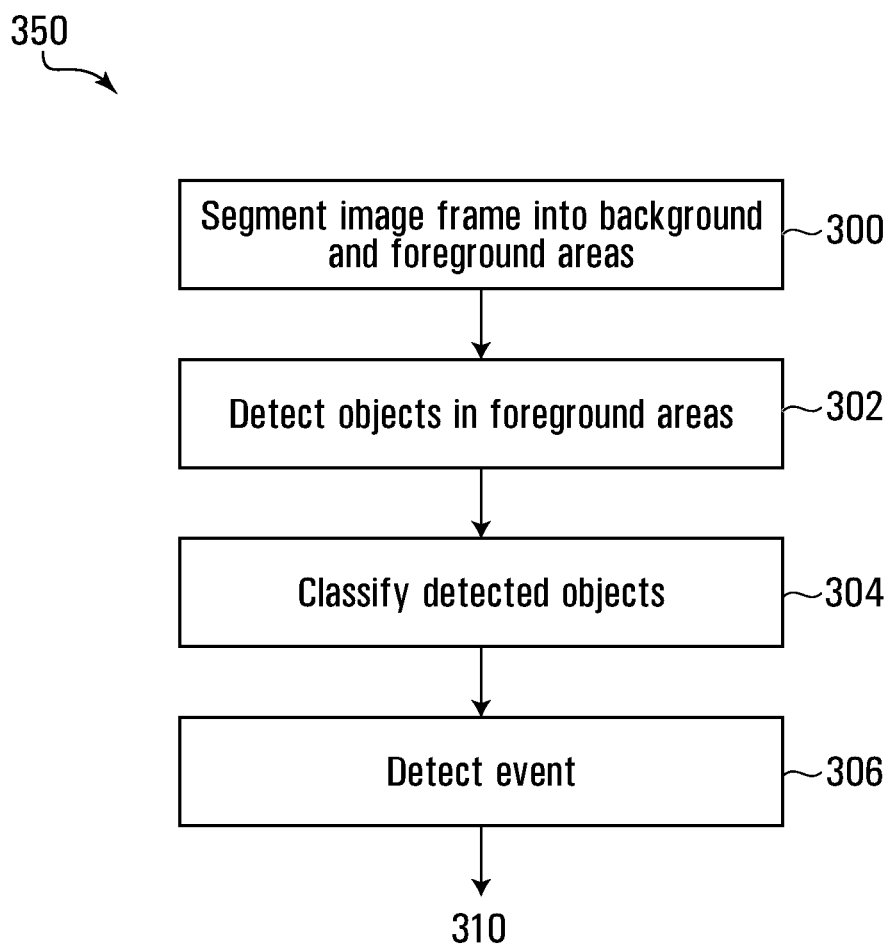
FIG. 3 illustrates a flow chart diagram of an example embodiment of generating an object cropped bounding box from video captured by one or more of the image capture devices.

Referring now to FIG. 3, therein illustrated is a flow chart diagram of an example embodiment of a method 350 for performing video analytics on one or more image frames of a video captured by a video capture device 108 to produce portions of the image frames that contain a visual object of interest (the portions herein referred to as "cropped bounding boxes"). The video analytics also determines properties or characteristics of the cropped bounding boxes and/or of the objects in the cropped bounding boxes.

At 300, at least one image frame of the video is segmented into foreground areas and background areas. At 302, one or more foreground visual objects in the scene represented by the image frame are detected based on the segmenting of 300. For example, any discrete contiguous foreground area or "blob" may be identified as a foreground visual object in the scene. For example, only contiguous foreground areas greater than a certain size (e.g. number of pixels) are identified as a foreground visual object in the scene.

Metadata may be further generated relating to the detected one or more foreground areas. The metadata may define the location, reference coordinates, of the foreground visual object, or object, within the image frame. For example, the location metadata may be further used to generate a bounding box (e.g. when encoding video or playing back video) outlining the detected foreground visual object. The image within the bounding box is extracted, for inclusion in metadata which along with the associated video may be processed further at other devices, such as workstation 156, on the network 140. In short, the cropped bounding box is a cropped portion of an image frame of the video containing the detected foreground visual object. The extracted image, which is the cropped bounding box, alternately may be smaller than what was in the bounding box or may be larger than what was in the bounding box. The size of the image being extracted, for example, should be close to, but outside of, the actual boundaries of the object that has been detected. The bounding boxes are typically rectangular in shape, but may also be irregular shapes which closely outline the objects. A bounding box may, for example, closely follow the boundaries (outline) of a human object.

In some example embodiments, the video analytics may further include, at 304, classifying the foreground visual object (or objects) detected at 302, wherein the classification is produced as metadata associated with the cropped bounding box. For example, pattern recognition may be carried out to classify the foreground visual objects. A foreground visual object may be classified by class, such as a person, a car or an animal. Additionally or alternatively, a visual object may be classified by action, such as movement and direction of movement of the visual object. Other classifiers may also be determined, such as color, size, orientation, etc. Visual classification may be performed according to systems and methods described in co-owned U.S. Pat. No. 8,934,709, which is incorporated by reference herein in its entirety.

The video analytics may further include, at 306, detecting whether an event has occurred and the type of event. Detecting the event may be based on a comparison of the classification of one or more foreground visual objects with one or more predefined rules. The event may be an event in anomaly detection or business intelligence, such as whether a video tripwire has been triggered, the number of persons present in one area, whether an object in scene has been "left behind" or whether an object in the scene has been removed.

An example of the video analytics, at 306, may be set to detect only humans and, upon such detection, extract cropped bounding boxes of the human objects, with reference coordinates of each of the cropped bounding boxes, for inclusion in metadata, which along with the associated video may be processed 310 further at other devices, such as workstation 156 on the network 140.

Figure 4:
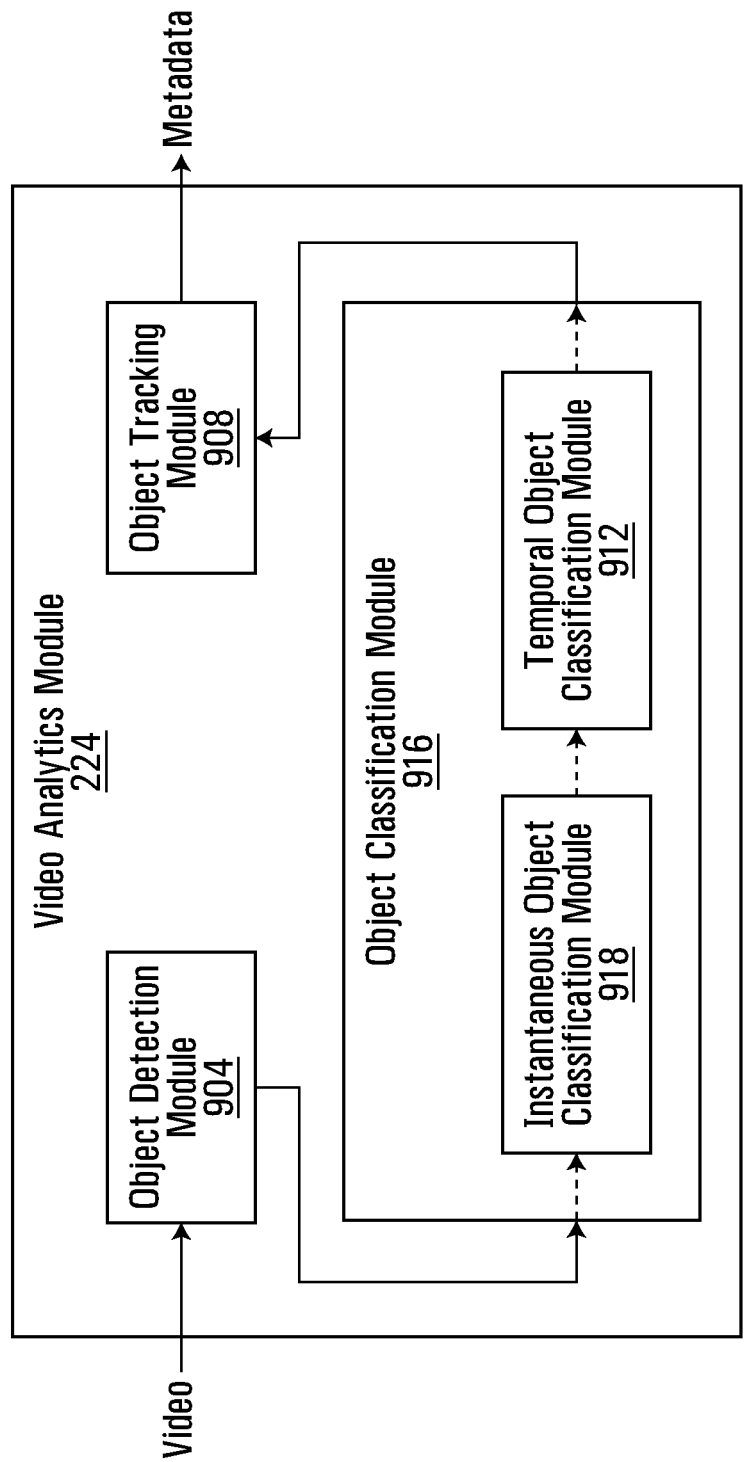
FIG. 4 illustrates a block diagram of a set of operational sub-modules of a video analytics module used in a cropped bounding box selection operation according to one example embodiment.

Referring now to FIG. 4, therein illustrated is a block diagram of a set of operational sub-modules of the video analytics module 224 according to one example embodiment. The video analytics module 224 includes a number of modules for performing various tasks. For example, the video analytics module 224 includes an object detection module 904 for detecting objects appearing in the field of view of the video capturing device 108. The object detection module 904 may employ any known object detection method such as motion detection and blob detection, for example. The object detection module 904 may include the systems and use the detection methods described in U.S. Pat. No. 7,627,171 entitled "Methods and Systems for Detecting Objects of Interest in Spatio-Temporal Signals," the entire contents of which are incorporated herein by reference.

The video analytics module 224 also includes an object tracking module 908 connected or coupled to the object detection module 904. The object tracking module 908 is operable to temporally associate instances of an object detected by the object detection module 908. The object tracking module 908 may include the systems and use the methods described in U.S. Pat. No. 8,224,029 entitled "Object Matching for Tracking, Indexing, and Search," the entire contents of which are incorporated herein by reference. The object tracking module 908 generates metadata corresponding to visual objects it tracks. The metadata may correspond to signatures of the visual object representing the object's appearance or other features, or signatures generated by a neural network, such as a convolutional neural network. The metadata is transmitted to the server 406 for processing.

The video analytics module 224 also includes an object classification module 916 which classifies detected objects from the object detection module 904 and connects to the object tracking module 908. The object classification module 916 may include internally, an instantaneous object classification module 918 and a temporal object classification module 912. The instantaneous object classification module 918 determines a visual object's type (e.g. human, vehicle, animal) based upon a single instance of the object. The input to the instantaneous object classification module 916 is preferably a sub-region (for example within a bounding box) of an image in which the visual object of interest is located rather than the entire image frame. A benefit of inputting a sub-region of the image frame to the classification module 916 is that the whole scene need not be analyzed for classification, thereby requiring less processing power. The video analytics module 224 may, for example, filter out all object types except human for further processing.

The temporal object classification module 912 may also maintain class (e.g. human, vehicle, animal) information of an object over a period of time. The temporal object classification module 912 combines the instantaneous class information of the object provided by the instantaneous object classification module 918 over a period of time during the lifetime of the object. In other words, the temporal object classification module 912 determines the objects type based on its appearance in multiple frames. The temporal object classification module 912 may combine information regarding the trajectory of an object (e.g. whether the trajectory is smooth or chaotic, whether the object is moving or motionless) and confidence information of the classifications made by the instantaneous object classification module 918 averaged over multiple frames. For example, classification confidence values determined by the object classification module 916 may be adjusted based on the smoothness of trajectory of the object. The temporal object classification module 912 may assign an object to an unknown class until the visual object is classified by the instantaneous object classification module 918 a sufficient number of times and a predetermined number of statistics have been gathered. In classifying an object, the temporal object classification module 912 may also take into account how long the object has been in the field of view. The temporal object classification module 912 may make a final determination about the class of an object based on the information described above. The temporal object classification module 912 may also use a hysteresis approach for changing the class of an object. More specifically, a threshold may be set for transitioning the classification of an object from unknown to a definite class, and that threshold may be larger than a threshold for the opposite transition (e.g., from a human to unknown). The object classification module 916 may generate metadata related to the class of an object, and the metadata may be stored in a database of the storage module 240.

As an object (e.g. a human) enters a scene, it is detected by the object detection module 904 as an object. The object classification module 916 would then classify the object as a human or person with a confidence level for the object to be a human. The object is tracked in the scene by the object tracking module 908 through each of the image frames of the video captured by the camera 108. The object may also be identified by a track number as it is being tracked ("Object ID").

In each image frame, an image of the object, within a bounding box surrounding the object, is extracted from the image frame and the image is a cropped bounding box. The object classification module 916 provides a confidence level for the object as being a human for each image frame, for example.

The video analytics module 224 keeps a list of a certain number of cropped bounding boxes showing a particular object, for example the top ten cropped bounding boxes with the highest confidence levels as the object is tracked in the scene 402. When the object tracking module 908 loses track of the object or when the object exits the scene, the cropped bounding box 404 is selected from the list of ten cropped bounding boxes which shows the object with the largest number of foreground pixels (or object pixels). The cropped bounding box 404 is sent with the metadata to the server 406 for further processing, or is processed locally at the camera 108. The cropped bounding box 404 represents the image of the object over this tracked period of time. The confidence levels are used to reject cropped bounding boxes which may not represent a good picture of the object such as when the object crosses a shadow. Alternatively, more than one cropped bounding box may be picked from the list of top ten cropped bounding boxes for sending to the server 406. For example, another cropped bounding box selected by the remaining highest confidence level may be sent as well.

Figure 5:
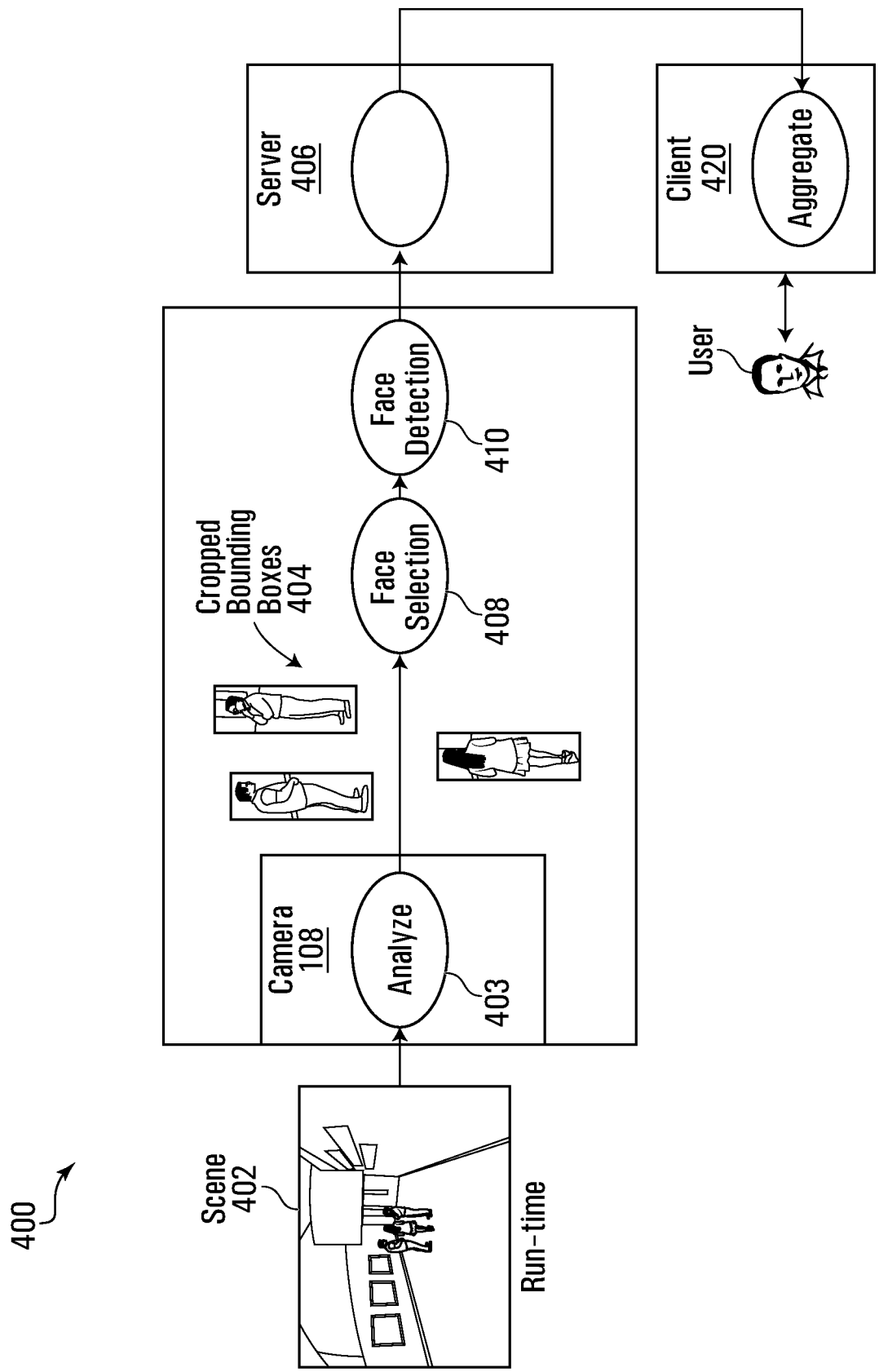
FIG. 5 illustrates a schematic flow diagram of a method for detecting a face in the video captured by the one of more image capture devices according to an example embodiment, wherein a cropped bounding box selection operation receives the object cropped bounding boxes and selects one or more of the cropped bounding boxes for processing by a face detection operation.

Referring now to FIG. 5, and according to one embodiment, a method for detecting one or more faces from a video of a scene 402 includes a cropped bounding box selection operation 408 which for each target object in the scene, assesses the metadata of a cropped bounding box 404 associated with the target object, assigns a ranking to the target object based on the metadata, and selects the cropped bounding box 404 for a face detection operation 410 when the ranking exceeds a defined threshold. Each target object has an associated cropped bounding box 404 for each video frame that is processed by the face selection operation 408. The cropped bounding box selection operation 408 is performed on a frame by frame basis to determine which cropped bounding boxes 404 for a given target object needs to be processed for face detection within a finite time budget. Each target object in the scene 402 has as associated Object ID. Each cropped bounding box 404 in a video frame is tagged with the Object ID of the target object shown in the cropped bounding box 404, such that in any given video frame, there are N cropped bounding boxes that belong to N target objects. Depending on the time and computing resource limitations, the face selection operation 408 will only select a subset of the N cropped bounding boxes for face detection, i.e. those cropped bounding boxes showing target objects with rankings that exceed the defined threshold. The ranking of each of the N target objects are updated each time a video frame is processed by the face selection operation 408, such that a new subset of cropped bounding boxes 404 belonging to the highest ranking target objects can be selected for the face detection operation 410. By only processing a subset of cropped bounding boxes, the system is expected to be able to detect faces more quickly and efficiently compared to processing all of the cropped bounding boxes or the entire video, which may be particularly useful when the system is operationally constrained, e.g. by time or by available computing resources.

The video of the scene 402 is captured by a video capture device (camera) 108. The scene 402 is within the field of view of the camera 108 and can contain one or more objects. The video is analyzed and processed 403 in the camera 108 to produce cropped bounding boxes 404 of the object(s) with associated metadata. In the example shown in FIG. 5, the video analytics module 224 is programmed to classify objects, and produce target cropped bounding boxes 404 containing objects classified as humans.

In the camera 108, there is a processor and a memory which stores a face detection scheduler ("FDS") program of the video analytics module 224, that when executed by the processor performs the cropped bounding box selection operation 408. For a selected video frame, the FDS program 408 receives the cropped bounding boxes 404 in that frame. The FDS program then executes the cropped bounding box selection operation 408 to assign a ranking to each target object in the video frame, wherein the assigned ranking is based on associating the metadata in the cropped bounding box 404 tagged with the Object ID of the target object, with a higher or lower priority for detecting a human face in the cropped bounding box 404, and then produces a priority table comprising a ranked list of the target objects in the video frame. The cropped bounding boxes 404 for the target object(s) with rankings above a selected threshold are selected for processing by the face detection operation 410. The selected threshold can be selected based on operational criteria/limitations. For example, if face detection is being performed in real time with a live video stream, it will be expected that the face detection results be provided within a relatively short time after the live scene is captured; it may be required to limit the number of cropped bounding boxes 404 that are processed by the face detection operation 410 to meet this time constraint. Another limitation to the number of cropped bounding boxes 404 processed by the face detection operation 410 may be the processing capacity allocated to this operation; the processing capacity of the system dedicated for face detection can be limited, especially since processing by the video analytics module 224 to produce the cropped bounding boxes 404 can take up a considerable amount of computing resources.

The camera 108 further includes a program executable by the processor to perform a face detection operation 410. The face detection operation 410 can be a program that uses facial detection techniques known in the art. After the cropped bounding boxes 404 selected by the face selection operation 408 in the current video frame are processed by the face detection operation 410, a new video frame is processed by the face selection operation 408, and the priority table is updated with the new rankings assigned to the target objects in the new video frame, and a new subset of cropped bounding boxes are selected for the face detection operation 410. This process is repeated for a group of video frames in the video.

The results of the face detection operation 410 are then aggregated and output to a server 406 which can be accessed by a user using a client computing device 420.

As noted previously, the role of the cropped bounding box selection operation is to receive the cropped bounding boxes 404 and to analyze the object and its metadata in each cropped bounding box 404, and to assign a ranking to the object based on a priority associated with the metadata. The metadata for each cropped bounding box 404 can include one or more of the following:

a. the trajectory of the object;
b. the last time a face associated with the object was detected, and optionally the quality of the last detected face;
c. the classification of the object as a human;
d. the color of the object;
e. the sharpness of the object;
f. the contrast of the object;
g. the location of the object in the video image;
h. the presence of a potential occlusion in the video image; and
i. for previously recorded video, the last time a human object with no associated detected face was visible in the video.

Figure 6:
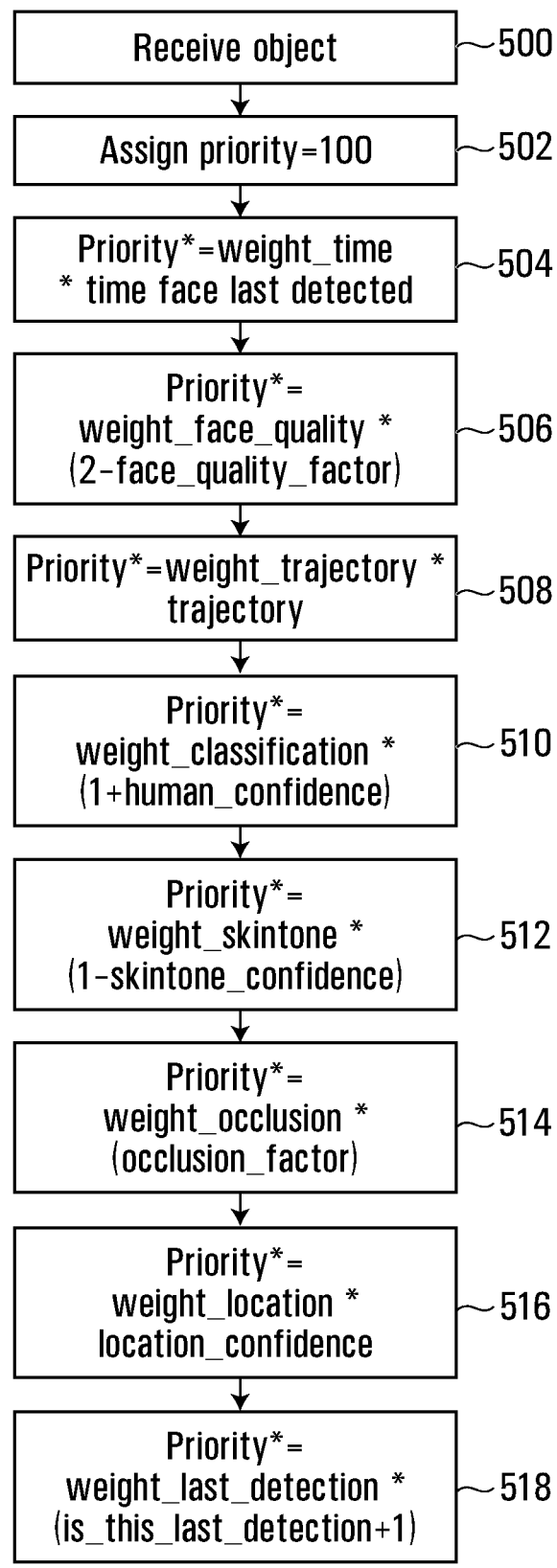
FIG. 6 illustrates a flow chart of steps performed by the cropped bounding box selection operation according to an example embodiment.

Referring now to FIG. 6, the cropped bounding box selection operation 408 performs a series of steps to calculate an overall priority value ("ranking" or "Object Priority Value") to a target object using the priority values associated with the characteristics found in the metadata of the cropped bounding box 404 associated with the target object (i.e. tagged with the Object ID of the target object). The priority value of each characteristic can be user defined and is generally based on the relevance of each characteristic to the importance of performing a face detection operation on the present cropped bounding box 404. The cropped bounding box selection operation 408 starts by receiving a cropped bounding box 404 produced by the video analytics module 408 (block 500). Then, a starting Object Priority Value of 100 is assigned to the cropped bounding box 404 (block 502). In each of blocks 504 to 518, the Object Priority Value is adjusted by multiplying the Object Priority Value with a multiplier ("Characteristic Multiplier") that is a function of the relevance of a particular characteristic to performing a face detection on the cropped bounding box 404. The weighting of the Characteristic Multiplier for each characteristic can be adjusted by a user-defined weighting factor ("Characteristic Weighting Factor").

In block 504, a Characteristic Multiplier labelled "time_face_last_detected" is calculated that is a function of the time since a face was last detected for the object in the cropped bounding box 404. The metadata for this characteristic is a pointer to a database (not shown) that stores a record of detected faces that were previously detected by the face detection operation 410, wherein each database record contains a detected face, one or more cropped bounding boxes having the detected face, and a time stamp of each cropped bounding box having the detected face. If the metadata for the current cropped bounding box 404 being processed contains such a pointer, the face selection operation 408 will assign a value for "time_face_last_detected", wherein a maximum value is assigned for time stamps older than a user-defined maximum time period, and a minimum value is assigned for time stamps younger than a user-defined minimum time period, the reasoning being a higher priority should be given to process objects for which a face has not been detected recently. A user defined weighting factor labelled "weight_time" can be applied to the "time_face_last_detected" Characteristic Multiplier. The product of 100, the "weight_time" value and the "time_face_last_detected" value is calculated and the Object Priority Value is updated with this result.

In Block 506, a Characteristic Multiplier labelled "face_quality_factor" is calculated that is a function of the quality of a face previously associated with the object in the cropped bounding box 404. Like block 504, the metadata for this characteristic is a pointer to the database that stores a record of detected faces that were previously detected by the face detection operation 410, wherein each database record further contains a quality grading for each cropped bounding box 404 having the detected face. If the metadata for the current cropped bounding box 404 being processed contains such a pointer, the face selection operation 408 will assign a value for "face_quality_factor", wherein a maximum value of 1 is assigned for faces having a high quality grading, and with lower values assigned for faces having lower quality gradings, the reasoning being a higher priority should be given to process cropped bounding boxes 404 with detected faces that have poorer quality. A user defined weighting factor labelled "weight_face_quality" can be applied to the "face_quality_factor" Characteristic Multiplier. The product of the Object Priority Value output from block 504, the "weight_face_quality" value and the difference of 2 minus the "face_quality_factor" value is calculated and the Object Priority Value is updated with this result.

In block 508, a Characteristic Multiplier labelled "trajectory" is calculated that is a function of the trajectory of the object moving in the video. The metadata for this characteristic is the trajectory angle of the object (labelled "trajectory"). If the metadata for the current cropped bounding box 404 being processed contains a trajectory angle, the cropped bounding box selection operation 408 will assign a priority value for "trajectory" that is higher for an object having a trajectory moving towards the camera, and lower for an object having a trajectory moving away from the camera. A user defined weighting factor labelled "weight_trajectory" can be applied to the "trajectory" Characteristic Multiplier. The product of the Object Priority Value output from block 506, the "weight_trajectory" value and the "trajectory" value is calculated and the Object Priority Value is updated with this result.

In block 510, a Characteristic Multiplier labelled "human confidence" is calculated that is a function of the likelihood that the object is a human based on the shape of the object. The metadata for this characteristic is a human classification value provided by the video analytics module 224. A classification that is considered unlikely to be a human is assigned a value of 0, and a classification that is considered likely to be a human is assigned a value greater than 0, based on the reasoning that an object that is a human should be given a higher priority A user defined weighting factor labelled "weight_classification" can be applied to the "human confidence" Characteristic Multiplier. The product of the Object Priority Value output from block 508, the "weight_classification" value and the sum of one and the "human confidence" value is calculated and the Object Priority Value is updated with this result.

In block 512, a Characteristic Multiplier labelled "skintone_confidence" is calculated that is a function of the likelihood that the object includes a human face based on the color of the object. The metadata for this characteristic is a skin tone confidence value provided by the video analytics module 224 that is calculated by comparing the pixel color of the object with a range of colors associated with the skin tone of a human face. Skin tone pixel determination techniques are known in the art, and for example are disclosed in: "A Method of Gesture Segmentation Based on Skin Color and Background Difference Method," D. Hong and L. Yang, Proc. Of the 2nd International Conf. on Computer Science and Electronics Engineering (ICCSEE), 2013, and "A Comprehensive Survey on Human Skin Detection," M. R. Mahmoodi and S. M. Sayedi, Intl. Journal of Image, Graphics and Signal Processing (IJIGSP), Vol. 8, No. 5, May 2016, both of which are herein incorporated by reference. Using such techniques, a comparison can involve identifying pixels in the object that have a color within the skin tone color range, and giving a value to objects that have a minimum number of pixels with colors within the skin tone range. For example, a minimum percentage of pixels in the skin tone range for a given area can be defined, below which it is unlikely that the object contains a detectable human face; objects having fewer pixels than this minimum percentage can be assigned a minimum skin tone confidence value of 0, and objects having more pixels than the minimum percentage can be assigned a skin tone confidence value greater than 0, with the confidence value being proportional to the number of contiguous pixels in the skin tone range.

A user defined weighting factor labelled "weight_skintone" can be applied to the "skintone_confidence" Characteristic Multiplier. The product of the Object Priority Value output from block 510, the "weight_skintone" value and the sum of one plus the "skintone_confidence" value is calculated and the Object Priority Value is updated with this result.

In block 514, a Characteristic Multiplier labelled "occlusion_factor" is calculated that is a function of the likelihood that an object will be blocked from view of the camera by a potential occlusion in the video frame. Objects with a higher likelihood of occlusion will be assigned a higher occlusion_factor value, with the reasoning being that a higher priority should be assigned to detect a face in an object that will become occluded. The metadata for this characteristic is the potential presence of an occlusion in the video image, and trajectory angle of the object. The video analytics module 224 can assess the likelihood of the object being occluded by projecting the path of the object from the trajectory data, and will assign a higher occlusion_factor value when it calculates a higher likelihood that the object will be occluded. If there is no occlusion in the video image, then a minimum occlusion factor of 1 can be assigned. A user defined weighting factor labelled "weight_occlusion" can be applied to the "occlusion_factor" Characteristic Multiplier. The product of the Object Priority Value output from block 512, the "weight_occlusion" value and the "occlusion_factor" value is calculated and the Object Priority Value is updated with the result.

In block 516, a Characteristic Multiplier labelled "location_confidence" is calculated that is a function of the location of the object in the video frame, and the frequency of successful past face detections in that location. Locations with a higher frequency of successful past face detections will be assigned a higher location_confidence value, with the reasoning being that a higher priority should be assigned to detect a face when an object is in a location that favors successful face detections, possibly because the location is well lit or is unobstructed. The metadata for this characteristic is the location of the object in the frame of the video, and a pointer to a database containing a history of successful face detections in that location. A user defined weighting factor labelled "weight_location" can be applied to the "location_confidence" Characteristic Multiplier. The product of the Object Priority Value output from block 514, the "weight_location" value and the "location_confidence" value is calculated and the Object Priority Value is updated with the result.

In block 518 a Characteristic Multiplier labelled "is_this_last_detection" is calculated for the cropped bounding box, with the value being a function of the last time a human object is seen in a video. This calculation can be performed on a live video or a previously recorded video. When the video analytics module 224 determines that a human object is not being tracked any more, the video analytics module identifies this time as a finalization point representing the last time the human object is seen in the video. When the metadata for the cropped bounding box 404 includes such a finalization point, and the face of the human object has not been previously detected, or more than a specified period of time has elapsed since the face was last detected, then the face selection operation assigns a higher priority value to the "is_this_last_detection" Multiplier, with the reasoning that the last time the human was visible in the video may be the last opportunity to detect the face of the human. The metadata for this characteristic is the classification of the object as a human (whether by shape, skin tone or some other characteristic), and time stamps of the period when the human was visible in the video. A user defined weighting factor labelled "weight_last_detection" can be applied to the "is_this_last_detection" Characteristic Multiplier. The product of the Object Priority Value output from block 516, the "weight_last_detection" value and the "is_this_last_detection" value is calculated and the Object Priority Value is updated with the result.

In addition to the object characteristics shown in FIG. 6, the cropped bounding box selection operation can assess other characteristics in assigning an Object Priority Value to the target object. For example, the metadata can include image quality characteristics such as sharpness and contrast of the associated cropped bounding box 404, in which case Characteristic Multipliers representing the cropped bounding box sharpness and the cropped bounding box contrast can be provided, wherein cropped bounding boxes with a sharpness and/or contrast that meet or exceed a user defined threshold will be assigned a higher Characteristic Multiplier. Image quality assessment techniques are well known in the art and thus are not described in detail here.

The cropped bounding box selection operation 408 is performed on a group of video frames of the video. For each video frame, a priority table is produced comprising each cropped bounding box 404, its Object ID, and the Object Priority Value of the target object associated with the Object ID. The defined threshold for selecting cropped bounding boxes 404 for face detection will depend on the available time and computing resources for performing the face detection operation, and cropped bounding boxes 404 having an Object Priority Value at or above the defined threshold are selected for the face detection operation 410.

Alternatively or additionally, other factors can be applied to rank the target objects. Such other factors include the confidence value that the associated cropped bounding box contains a face, the size of the face in the associated cropped bounding box (the larger the face the higher the target object's ranking), and the pose of the face in the associated cropped bounding box (a frontal view is given a higher ranking than other views).

The number of cropped bounding boxes 404 selected for processing by the face detection operation 410 will depend on the number of different humans to be processed by the face detection operation 410, and the computational resources that are available for face detection. For example, if there is only one person in the video over a period of time, the cropped bounding box selection operation may be able to select more than one Cropped bounding box of the person for processing by the face detection operation. If on the other hand, there are multiple persons in the video over a period of time, the cropped bounding box selection operation may only select one cropped bounding box of each person, representing the "best face" for that person, for processing by the face detection operation.

Figure 7:
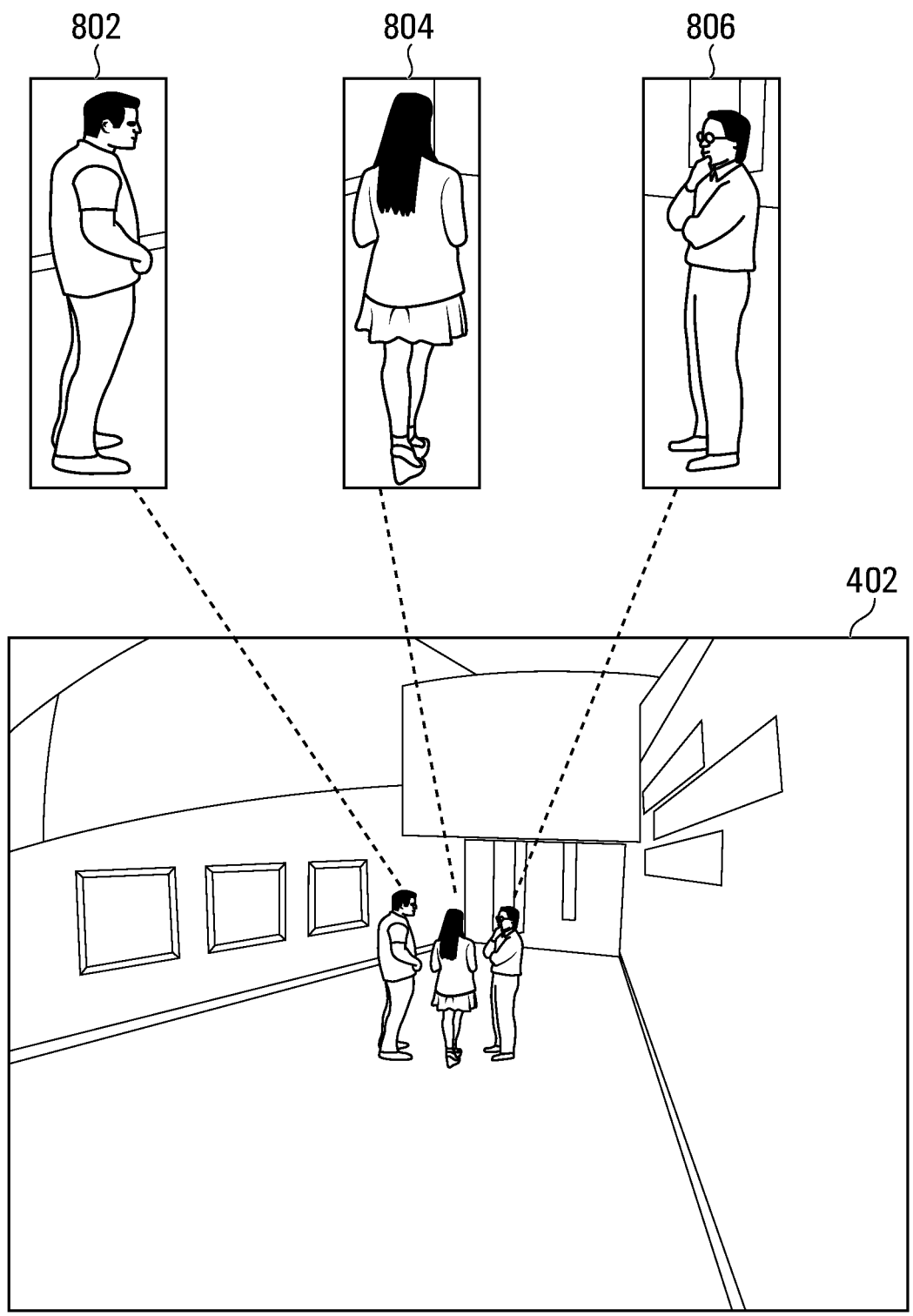
FIG. 7 illustrates the scene and the cropped bounding boxes of the example embodiment of FIG. 5.

Referring now to FIG. 7, therein illustrated is the scene 402 and the cropped bounding boxes 404 of the example embodiment of FIG. 5. There is shown in the scene 402 with the three people who are detected and their images 802, 804, 806 are extracted by the camera 108 and sent to the server 406 as the cropped bounding boxes 404. The images 802, 804, 806 are the representative images of the three people in the video over a period of time. The three people in the video are in motion and their captured images will accordingly be different over a given period of time. To reduce the cropped bounding boxes 404 to a manageable number for face detection, the cropped bounding box selection operation 408 can select only one cropped bounding box for each person representing the best face of the person for face detection processing.

The time required to carry out face detection operation 410 is typically correlated with the size of the cropped bounding box being processed ("Target Cropped Bounding Box"). To reduce the computation burden and increase processing speed, the face detection operation 410 can be configured to process as small an area as possible. Some configurations include:

a. Process only a top portion of the Target Cropped Bounding Box, since the head is expected to be at the top of the Target Cropped Bounding Box.

b. Apply a learnt face size model to limit the search area, by:

i. skipping cropped bounding boxes that are too big;

ii. setting the minimum face size for search, which can also increase the processing speed; and iii. adjusting the resolution at which to run the face detection: in an area where faces are typically large, face detection can run on a lower resolution cropped bounding box.

Additional speed can be achieved by sequentially executing multiple face detection operations on the same video. A first face detection operation can be quick but prone to false detections. A second face, slower but more accurate detection operation is then executed to verify the results of the first operation, wherein the second face detection operation is restricted to only the portions of the video wherein the first face detection operation identified faces. This significantly reduces the search area and thus the speed for the second search.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

We claim:

1. A non-transitory computer readable medium having recorded thereon program code executable by a processor to perform a method comprising:

receiving a video frame of a scene captured by a video capture device;

identifying multiple objects in the video frame and producing multiple cropped bounding boxes each comprising a respective portion of the video frame bounding at least a respective portion of one of the identified objects and metadata representing one or more characteristics of the identified objects or cropped bounding boxes;

assigning a respective ranking of a plurality of rankings, based on associating the one or more characteristics with a higher or lower priority for detecting a human face in a respective cropped bounding box of the cropped bounding boxes, to each of the identified objects, wherein the respective ranking is a respective product of a respective characteristic multiplier, being a function of relevance of a particular characteristic to face detection, and a respective characteristic weighting factor;

producing a priority table comprising the identified objects listed by the assigned rankings; and selecting a subset of the multiple cropped bounding boxes for a face detection operation, wherein inclusion in the selected subset is based on the respective one or more rankings of one or more of the identified objects from the priority table selected for inclusion in the selected subset.

2. The non-transitory computer readable medium as claimed in claim 1, wherein the one or more characteristics include a trajectory, and wherein a trajectory moving away from the video capture device is associated with the lower priority.

3. The non-transitory computer readable medium as claimed in claim 2, further comprising identifying an occlusion in the video frame, and wherein a trajectory moving towards the occlusion is associated with the higher priority.

4. The non-transitory computer readable medium as claimed in claim 1, wherein the one or more characteristics include a human classification, and wherein a human classification having a confidence value exceeding a selected threshold is associated with the higher priority.

5. The non-transitory computer readable medium as claimed in claim 1, wherein the one or more characteristics include a color, and wherein a color corresponding to a human skin tone is associated with the higher priority.

6. The non-transitory computer readable medium as claimed in claim 5, wherein the one or more characteristics include pixel location and color, and wherein a selected number of contiguous pixels having colors corresponding to a human skin tone is associated with the higher priority.

7. The non-transitory computer readable medium as claimed in claim 1, wherein the one or more characteristics include pixel sharpness or contrast.

8. The non-transitory computer readable medium as claimed in claim 1, wherein the one or more characteristics is a previously detected face, and wherein an object having a previously detected face detected after a selected time period is associated with the higher priority.

9. The non-transitory computer readable medium as claimed in claim 1, wherein the one or more characteristics further include a quality of a previously detected face, and wherein an object having a previously detected face with a quality below a selected threshold is associated with the higher priority.

10. The non-transitory computer readable medium as claimed in claim 1, wherein the one or more characteristics includes a location, and wherein a location with a number of previous face detections exceeding a selected threshold is associated with the higher priority.

11. A method for selecting an object for a face detection operation, comprising:

receiving a video frame of a scene captured by a video capture device;

identifying multiple objects in the video frame and producing multiple cropped bounding boxes each comprising a respective portion of the video bounding at least a respective portion of one of the identified objects and metadata representing one or more characteristics of the identified objects or cropped bounding boxes;

assigning a respective ranking of a plurality of rankings, based on the one or more characteristics being associated with a higher or lower priority for detecting a human face in a respective cropped bounding box of the cropped bounding boxes, to each of the identified objects, wherein the respective ranking is a respective product of a respective characteristic multiplier, being a function of relevance of a particular characteristic to face detection, and a respective characteristic weighting factor;

producing a priority table comprising the identified objects listed by the assigned rankings; and selecting a subset of the multiple cropped bounding boxes for the face detection operation, and wherein inclusion in the selected subset is based on the respective one or more rankings of one or more of the identified objects from the priority table selected for inclusion in the selected subset.

12. The method as claimed in claim 11, wherein the one or more characteristics include a trajectory, and wherein a trajectory moving away from the video capture device is associated with the lower priority.

13. The method as claimed in claim 12, further comprising identifying an occlusion in the video frame, and wherein a trajectory moving towards the occlusion is associated with the higher priority.

14. The method as claimed in claim 11, wherein the one or more characteristics include a human classification, and wherein a human classification having a confidence value exceeding a selected threshold is associated with the higher priority.

15. The method as claimed in claim 11, wherein the one or more characteristics include a color, and wherein a color corresponding to a human skin tone is associated with the higher priority.

16. The method as claimed in claim 15, wherein the one or more characteristics include pixel location and color, and wherein a selected percentage of pixels having colors corresponding to a human skin tone is associated with the higher priority.

17. The method as claimed in claim 11, wherein the one or more characteristics include pixel sharpness or contrast.

18. The method as claimed in claim 11, wherein the one or more characteristics is a previously detected face, and wherein an object having a previously detected face detected after a selected time period is associated with the higher priority.

19. The method as claimed in claim 11, wherein the one or more characteristics further include a quality of a previously detected face, and wherein an object having a previously detected face with a quality below a selected threshold is associated with the higher priority.

20. The method as claimed in claim 11, wherein the one or more characteristics includes a location, and wherein a location with a number of previous face detections exceeding a selected threshold is associated with the higher priority.

21. A system for selecting an object for a face detection operation, comprising:
   at least one video capture device configured to capture at least one video of a scene; and
   a video analytics module communicative with the at least one video capture device to receive the at least one video, and comprising a processor and a memory having stored thereon program code executable by the processor to:
      identify multiple objects in a video frame of the at least one video and produce cropped bounding boxes each comprising a respective portion of the least one video frame bounding at least a respective portion of one of the identified objects and metadata representing one or more characteristics of the identified objects or cropped bounding boxes;
      assign a respective ranking of a plurality of rankings, based on the one or more characteristics being associated with a higher or lower priority for detecting a human face in a respective cropped bounding box of the cropped bounding boxes, to each of the identified objects, wherein the respective ranking is a respective product of a characteristic multiplier, being a function of relevance of a particular characteristic to face detection, and a respective characteristic weighting factor;
   producing a priority table comprising the identified objects listed by the assigned rankings; and
   select a subset of the multiple cropped bounding boxes for the face detection operation, and
   wherein inclusion in the selected subset is based on the respective one or more rankings of one or more of the identified objects from the priority table selected for inclusion in the selected subset.

* * * * *